Jan. 19, 1960   B. S. SHAW ET AL   2,921,415
CROSS FEED MECHANISM FOR MACHINE TOOL
Filed April 14, 1958   3 Sheets-Sheet 1
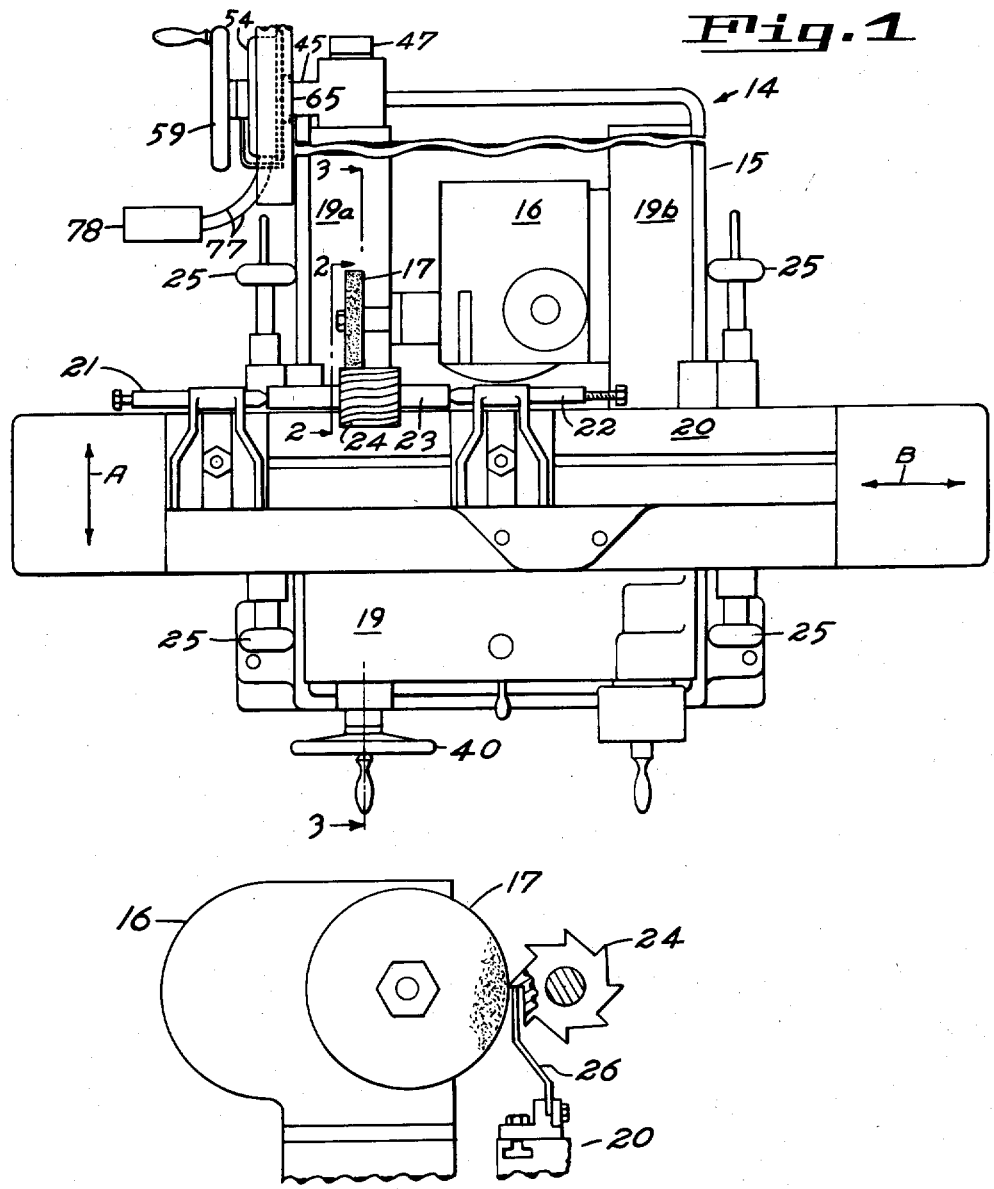
INVENTORS.
BERNARD S. SHAW
BY ARNOLD L. KELLERMANN
ATTORNEYS.

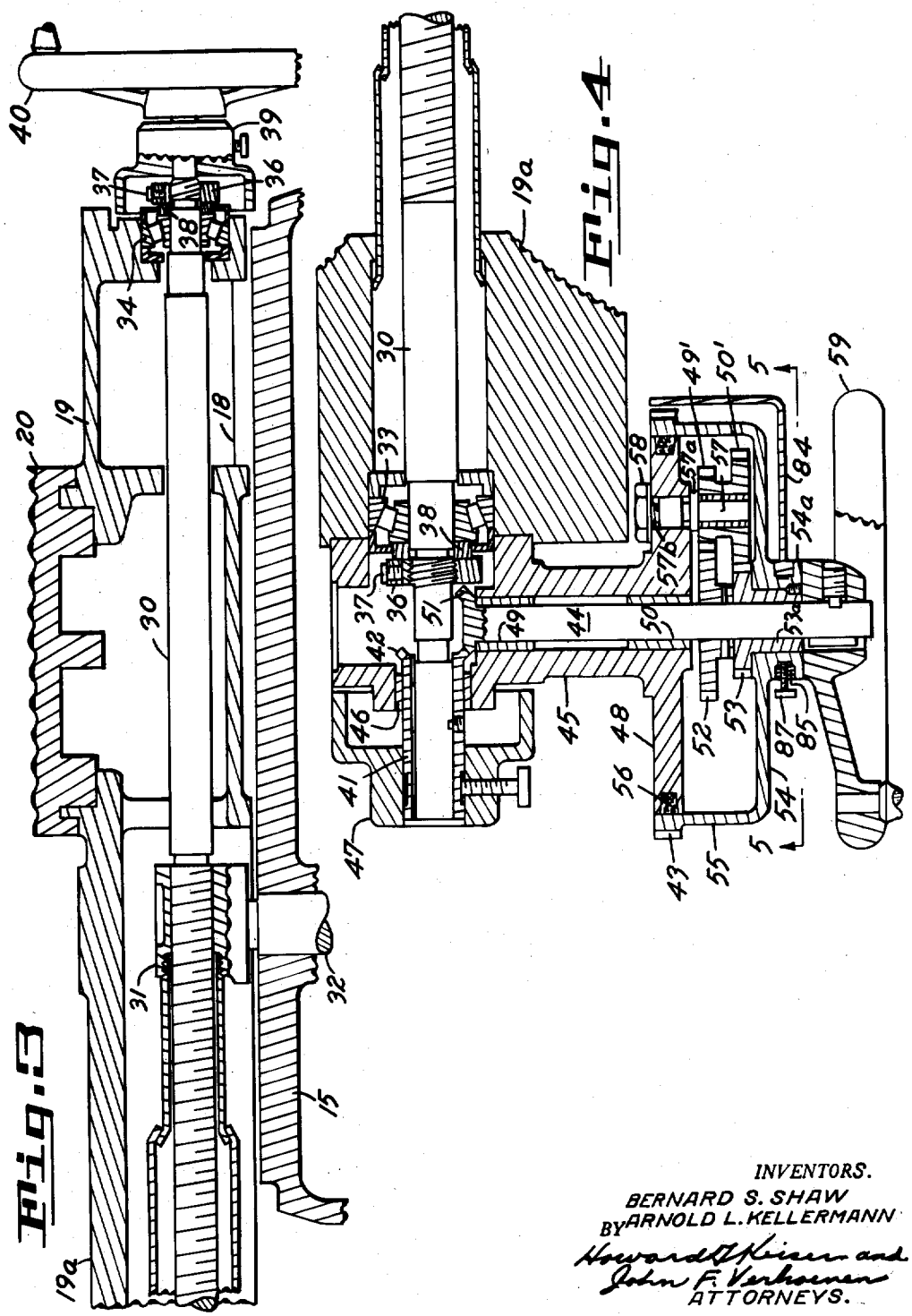

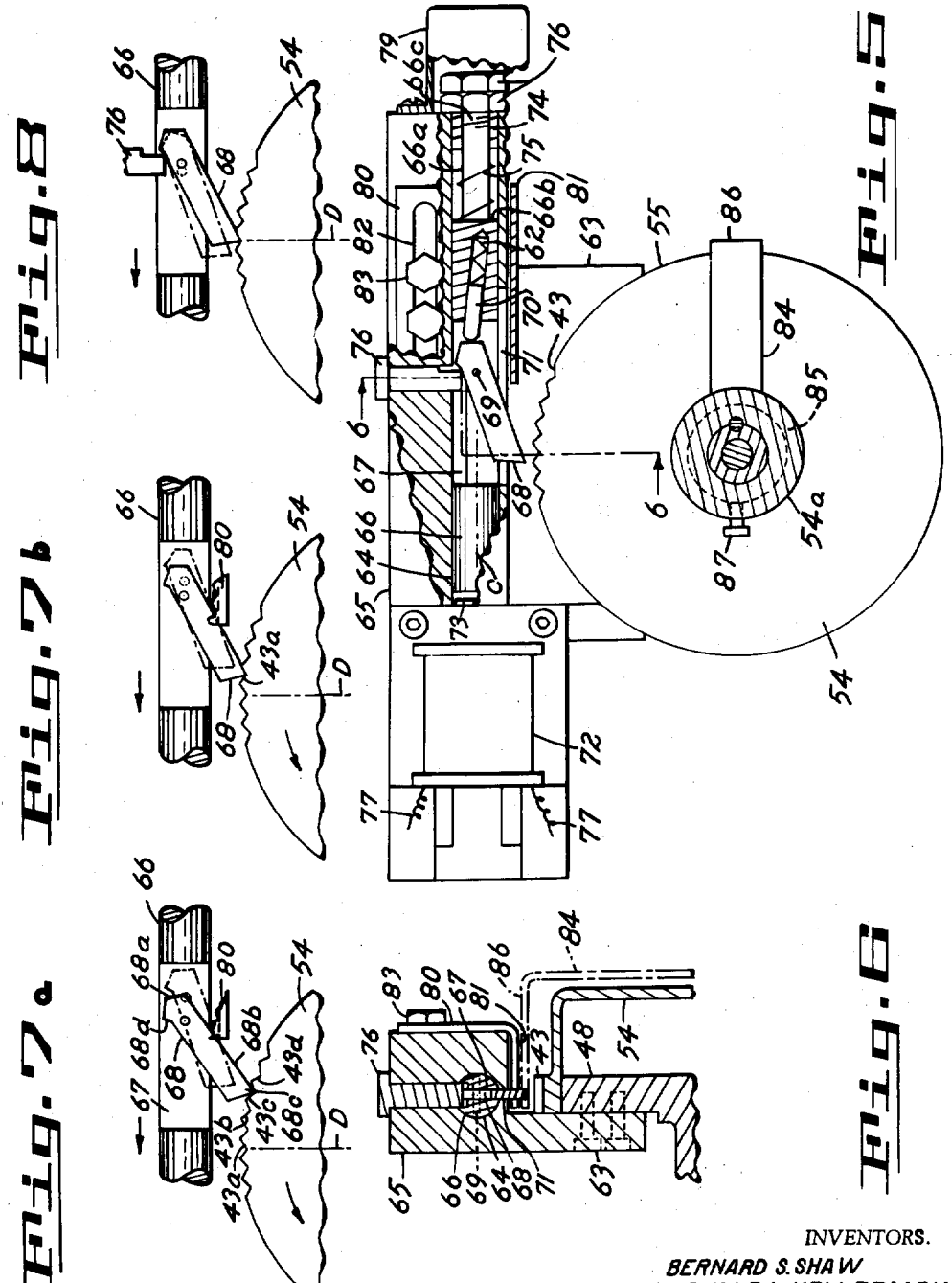

United States Patent Office 2,921,415
Patented Jan. 19, 1960

2,921,415

CROSS FEED MECHANISM FOR MACHINE TOOL

Bernard S. Shaw, Madeira, and Arnold L. Kellermann, Milford, Ohio, assignors to The Cincinnati Milling Machine Co., Cincinnati, Ohio, a corporation of Ohio Application April 14, 1958, Serial No. 728,430

7 Claims. (Cl. 51—165)

The present invention relates to a mechanism for a machine tool to produce cross feeding between the cutting member and work supporting member thereof in predetermined discrete amounts.

In the operation of machine tools it is desirable that the cross feeding before each cut between the cutting member and the workpiece, which feed defines the depth of cut, or stock removal, on the workpiece, be carefully controlled so that an optimum amount of stock will be removed during the cut for best results. Excessive stock removal will produce an unsatisfactory cut with the likelihood of rapid wear or damage to the cutting member, or damage to the workpiece, or both, while insufficient stock removal is unjustifiably time-consuming and inefficient.

In cutter grinders, where cutters are sharpened or formed by a grinding wheel, the problem of achieving the proper depth of cut is acute, particularly where diamond grinding wheels are used. In many cutter grinder operations it is necessary for the operator to hold the workpiece, or cutter, in engagement with a tool rest to assure proper orientation of the cutter and wheel, and also manually to feed the cutter longitudinally past the diamond wheel for cutting. Before each cut, heretofore, it has been necessary that the work supporting member, or cutting member, be moved manually by a handwheel for cross feeding to establish the depth of the next cut. Because it is tedious and time-consuming for the operator to shift his position and accurately set the handwheel for each cut, there has been a tendency for the operator to adjust the handwheel inaccurately and generally in excess of the optimum amount to reduce the number of cuts required on each tooth. When the cutting element is a diamond wheel, this wear-producing practice is costly.

A mechanism is provided in the present invention with which precise, predetermined, optimum crossfeeding is obtained before each cut with minimum attention required by the operator, thus reducing to a minimum the tendency for inaccurate or excessive stock removal. In brief, in the preferred embodiment of the present invention a cutting member and a workpiece supporting member are movable in relation to each other for cross feeding. A ratchet wheel is operatively connected to one of said members to produce a predetermined discrete movement thereof upon predetermined rotation of the ratchet wheel. A link having a pawl adapted to engage the ratchet wheel is actuated by a solenoid to carry the pawl over a series of ratchet teeth on the wheel. An adjustable bracket engages the pawl and guides it into engagement with selected teeth of that series so that a selected predetermined rotation of the ratchet wheel is achieved. Energization of the solenoid is controlled by a foot switch so that cross feed may be accomplished before each cut with minimum effort or attention of the operator. A detent engages the pawl after each discrete cross feeding movement to disengage the pawl from the ratchet wheel and thereby permit manual movement of the member by a handwheel if desired. A second bracket, rotatable with the ratchet wheel, is provided to engage the pawl and preclude engagement thereof with the ratchet wheel after the desired number of discrete cross feeding movements have been made to bring the workpiece to desired size, thereby preventing the possibility of producing an under-size workpiece.

It is, therefore, an object of the present invention to provide a mechanism which will produce precise predetermined cross feeding between the cutting member and the work supporting member in discrete amounts to assure optimum stock removal and reduce wear of or damage to the cutting element.

It is another object of the present invention to provide a mechanism which will provide precise predetermined cross feeding between the cutting member and the work supporting member in selected discrete amounts.

It is yet another object of the present invention to provide a mechanism which will provide precise predetermined cross feeding between the cutting member and the work supporting member in discrete amounts and which will become disengaged after each discrete movement to permit manual movement.

It is a further object of the present invention to provide a mechanism which will provide precise predetermined cross feeding between the cutting member and the work supporting member in discrete amounts until the workpiece is down to desired size and which will become disengaged thereafter.

It is still another object of the present invention to provide a mechanism for producing precise predetermined cross feeding movement of the cutting member and the work supporting member in discrete amounts which is operable with minimum effort by the operator.

It is an additional object to provide a mechanism to produce precise predetermined cross feeding movement of the cutting member and the work supporting member in discrete amounts which is of simple construction, easy to operate, and effective to achieve optimum cuts on the workpiece.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 1 is a top plan view of a cutter grinder having the mechanism of the present invention;

Fig. 2 is a view through section 2—2 of Fig. 1;

Fig. 3 is a view through section 3—3 of Fig. 1 showing in cross-section the forward portion of the saddle in elevation;

Fig. 4 is a plan view in cross-section of the rear portion of the saddle and the mechanism connected thereto;

Fig. 5 is a view through section 5—5 of Fig. 4;

Fig. 6 is a view through section 6—6 of Fig. 5;

Figs. 7a and 7b are schematic views showing selective engagement of the pawl with the ratchet wheel; and Fig. 8 is a schematic view showing disengagement of the pawl from the ratchet wheel.

A cutter grinder having the mechanism of the present invention is shown generally at 14 in Fig. 1. The cutter grinder has a base 15 which supports a swivel wheelhead 16 having a rotatable cutting member 17 which may, for example, be a diamond grinding wheel. The base has cross ways 18 (see Fig. 3) which carry a saddle 19, having rearwardly extending portions 19a and 19b as shown in Fig. 1. The saddle 19 carries a longitudinally slidable table 20. The table 20 has a pair of longitudinally slidable tailstocks 21 and 22 and defines a work supporting member. An arbor 23 carrying a workpiece 24, which may, for example, be a cutter, is rotatably mounted between the tailstocks. A tooth rest 26 is mounted on the table and is adapted to engage the cutter and hold the same in proper orientation in relation to the cutting member during the cutting operation as shown in Fig. 2. The saddle 19 is movable, in cross feeding movement, in relation to the base and wheelhead, and hence in relation to the rotatable wheel, as shown by the arrow A in Fig. 1. The table 20, and hence the workpiece 24, is movable in longitudinal feeding movement in relation to the saddle and the base to carry the workpiece past the wheelhead for cutting as shown by arrow B. Longitudinal movement of the table is achieved by rotation of any one of the knobs 25, which are operatively connected to the table. The wheel head 16 is movable vertically by means of a hand wheel (not shown) located on the side of base 15 under the saddle.

Cross movement of the saddle 19 on the crossways 18 is achieved by rotation of lead screw 30 which is threadedly engaged with nut 31. The nut 31 is held in fixed relation to the base 15 by a shaft 32 secured to the nut and received in the base. The lead screw 30 is rotatably supported in the saddle and extends across the saddle and through the portion 19a. The lead screw 30 is received in anti-friction bearing 34 mounted in the front of the saddle 19 and is also received in the anti-friction bearing 33 received in the rear of the portion 19a of the saddle (see Fig. 4). The lead screw 30 extends through the bearings 34 and 33 and is held against longitudinal movement in relation thereto by the washers 38 and the collars 36 received on the lead screw outboard of the bearings 33 and 34 respectively. The collars are threadedly received on the lead screw 30 to snugly hold the washers 38 against the bearings 33 and 34 and are secured to the lead screw by set screws 37. The portion of the lead screw 30 extending beyond the front portion of the saddle 19 receives thereon a calibrated dial 39 and a hand wheel 40. The opposite end of the lead screw 30 extending beyond the rear of the portion 19a of the saddle receives a sleeve 41 having a beveled gear 42 thereon in nonrotatable relation with the lead screw.

As shown in Fig. 4, housing 45 is connected to the rear of the portion 19a of the saddle and receives the lead screw extending therefrom. The sleeve 41 is rotatably received in a bushing 46 in one wall of the housing and extends through that wall with the bevel gear 42 inside the housing. The portion of the sleeve 41 extending outside the housing carries thereon a calibrated dial 47. The housing 45 extends perpendicular to the lead screw 30 and terminates in a flange 48. A shaft 44 is rotatably carried in bushings 49 and 50 within the housing, perpendicular to lead screw 30 and extends from the housing beyond the flange 48 thereof. The shaft 44 has a bevel gear 51 at one end within the housing which engages bevel gear 42. Outboard of the flange 48 the shaft 44 non-rotatably receives pinion 52, and outboard thereof, loosely receives pinion 53, having a hub 53a. This latter pinion is snugly received in the hub 54a of a drumshaped ratchet wheel 54. The ratchet wheel has a rim 55 which encircles the flange 48. A felt sealing ring 56 is received in the periphery of the flange 48 and slidably engages the inner surface of the rim 55. The outer surface of the rim 55 has circumferentially spaced ratchet teeth 43 thereon. A shaft 57 having a collar 57a and a threaded end portion 57b is received in the flange 48 and secured thereto by nut 58. The shaft 57 rotatably carries the connected pinions 49' and 50' which engage, respectively, the pinions 52 and 53. Outboard of pinion 53 the shaft 44 non-rotatably receives the hand wheel 59.

As shown in Figs. 5 and 6, block 65 has a leg 63 which is connected to the flange 48 so that the block extends over the teeth of the ratchet wheel and in spaced relation thereto. A link 66 which may, for example, be a rod has a longitudinal axis C and is slidably received in a bore 64 extending through the block 65. The link has a slot 67 cut therethrough in which a pawl 68 is pivotally carried by pin 69, defining a fulcrum therefor. The pawl has a rear upper surface 68a, a downwardly sloping lower rear surface 68b terminating in a nose 68c, and an upper forward surface 68d defining a shoulder (see Fig. 7a). A pin 70 received in the link and extending into the slot engages surface 68a of the pawl above the fulcrum. A spring 62 urges the pin 70 against the pawl to swing the nose 68c of the pawl through a slot 71 in the block 65 into engagement with the teeth 43 of the ratchet wheel. A solenoid 72 having a plunger 73 is connected to the block 65 and the plunger is received in the bore 64 to contact one end of the link 66 and move the same when the solenoid is energized. The solenoid 72 is connected by wires 77 to a foot-operated switch 78 (see Fig. 1) which, in turn, is connected to a source of energy (not shown). Upon energization of the solenoid 72 the plunger thereof moves a predetermined amount and moves the link 66 a predetermined amount to the right of the position shown in Fig. 5. The link 66 has a reduced portion 66a opposite the solenoid 72 and a shoulder 66b is defined where the portion 66a joins the other portion of the link. The portion 66a is slidably received in a bushing 74 in the block and has a threaded portion 66c extending outside the block. Nuts 76 are threadedly received on the portion 66c of the link and limit movement of the link to the left of the position shown in Fig. 5 by their engagement with the outer surface of the block. A guard 79 encloses the nuts 76 and the protruding portion of the link 66. A spring 75 is received on the reduced portion 66a of the link in the bore 64 between the shoulder 66b and the bushing 74. The spring urges the link to the left on deenergization of the solenoid 72. The block 65 slidably receives a detent pin 76 which extends into the slot 67 in the link and engages the shoulder 68d of the pawl above the fulcrum as the link approaches its left hand position as shown in Fig. 5. This swings the link out of engagement with the ratchet teeth.

A bracket 80 having a leg 81 has an elongated slot 82. The bracket is connected to the block 65 by bolts 83 which are received through the slot. Thus, the bracket is adjustable in relation to the block in a direction parallel to the longitudinal axis C of the link 66. The leg 81 of the bracket extends between the block 65 and the ratchet teeth 43 and engages the surface 68b of the pawl 68 as the link is moved. A second bracket 84 is connected to a ring 85 which is rotatably received in a recess on the hub 54a of the ratchet wheel. Set screw 87 in the ring 85 engages the hub 54a to adjustably fix the bracket 84 in relation to ratchet wheel 54. The bracket 84 has a leg 86 which is oriented parallel to and in spaced relation from the rim 55 and, as shown in phantom lines in Fig. 6, extends between the ratchet teeth 43 and the block 65 for engagement with the pawl 68 after a predetermined rotation of the ratchet wheel 54.

In the operation of the cutter grinder 14 the operator holds the cutter 24 so that one tooth thereof is in engagement with the tooth rest 26 for proper orientation with the diamond wheel as he feeds the table 20 longitudinally for cutting by rotation of one of the knobs 25. At the end of the pass he reverses rotation of the knob 25 and returns the workpiece to its initial position. Without removing his hands from the workpiece or the knob 25, he presses the foot switch 78 and thereby energizes the solenoid 72. This moves the link 66 to the right of the position shown in Fig. 5 a predetermined amount. Initial movement to the right of the link disengages the shoulder 68d of the pawl from the detent 76, and the nose 68c of the pawl is urged against the ratchet teeth by the pin 70. However, as the link continues its movement to the right, the surface 68b of the pawl will engage the leg 81 of the bracket 80 which will lift the pawl from the ratchet teeth. When the solenoid 72 is de-energized, the spring 75 urges the link to the left, and the pawl once again engages the ratchet teeth. The particular tooth which the pawl engages will depend on the longitudinal adjustment of the bracket 80. As shown in Fig. 7a, if the bracket 80 is adjusted to the right, the pawl as it moves to the left from the position shown in dotted lines to the position shown in solid lines will be guided down into engagement with the teeth when movement to the left is first begun and will engage a tooth such as 43c, which is the third tooth from the axis D. Since the pawl is disengaged from the ratchet teeth at the axis D, the ratchet wheel will be rotated an amount corresponding to three of the ratchet teeth thereon. If, however, the bracket 80 is adjusted to the left, as shown in Fig. 7b, the pawl will be prevented from engaging the ratchet teeth until movement of the link to the left is almost completed. With the bracket in this position, the pawl will engage tooth 43a, the first tooth from axis D, and, since the pawl becomes disengaged at the axis D, the ratchet wheel will be rotated an amount corresponding to one tooth thereon.

The bracket may, of course, be set between the positions shown in Figs. 7a and 7b for engagement of the pawl with tooth 43b, or may be set further to the right for a greater crossfeed on each energization of the solenoid. The disengagement of the pawl from the ratchet teeth at axis D is shown in Fig. 8. As the link 66 terminates its movement to the left, moving from the position shown in solid lines to the position shown in dotted lines, the shoulder 68d of the pawl engages detent 76 above the fulcrum of the pawl and the pawl is thereby swung out of engagement with the ratchet teeth, terminating rotation of the ratchet wheel.

The rotation of the ratchet wheel 54 rotates shaft 44 through pinions 53, 50, 49, and 52. This rotates lead screw 30 through bevel gears 51 and 42. The rotation of the lead screw 30 in the nut 31 moves the saddle 19, in which the lead screw is carried, in relation to the base 15 in which the nut is received. This moves the work supporting element defined by table and tailstocks towards the cutting element, defined by diamond grinding wheel 17, a predetermined selected amount for the next cut. Rotation of the ratchet wheel an amount corresponding to one tooth thereon may, for example, move the work supporting element .0005 inch towards the cutting element.

The bracket 84 may be set to preclude rotation of the ratchet wheel after a tooth of the cutter 24 has been ground to desired size. For example, if it is desired to remove .0015 from a tooth of the cutter, and rotation of the ratchet wheel an amount corresponding to one tooth thereon causes a cross feed of .0005, the bracket 84 will be initially set with the leg 86 thereof over the fourth tooth, 43d, from the axis D where the pawl disengages from the ratchet wheel. The bracket 84 rotates with the ratchet wheel and, after the desired rotation of the ratchet wheel an amount corresponding to three teeth thereon, the leg 86 of bracket 84 engages pawl 68 and prevents further engagement thereof with the ratchet wheel, and hence further rotation of the ratchet wheel. The ratchet wheel may then be returned to its initial position by means of handwheel 59 for grinding the next tooth of cutter 24.

What is claimed is:

1. In a cutter grinder having a grinding wheel, a tooth rest against which a cutter is manually held during grinding, and manually operable means to produce relative longitudinal feeding movement between the cutter and the grinding wheel for grinding of the cutter, a mechanism to produce cross feeding between the grinding wheel and the tooth rest in predetermined discrete amounts comprising a rotatable shaft operatively connected to one of said members to move the same upon rotation of the shaft, a ratchet wheel operatively connected to said shaft to rotate the same upon rotation of the ratchet wheel, a movable link adjacent the ratchet wheel, a solenoid engageable with said link and operable when energized to move said link a predetermined amount, means to move the link a like amount in the opposite direction when the solenoid is de-energized, a pawl carried by the link and operable when the link is moved in one of said directions to engage the ratchet wheel and rotate the same a predetermined amount, and means including a foot operable switch selectively to energize the solenoid.

2. In a cutter grinder having a grinding wheel, a tooth rest against which a cutter is manually held during grinding, and manually operable means to produce relative longitudinal feeding movement between the cutter and the grinding wheel for grinding of the cutter, a compact mechanism to produce cross feeding between the grinding wheel and the tooth rest in predetermined discrete amounts comprising a housing, a shaft rotatably received in the housing and operatively connected to one of said members to move the same upon rotation of the shaft, a pinion loosely received on said shaft, a ratchet wheel carried by said pinion for rotation therewith, a second pinion snugly received on said shaft, a pair of connected gears rotatably carried by the housing and in engagement with said pinions to rotate the shaft upon rotation of the ratchet wheel, a movable link slidably mounted adjacent the ratchet wheel, a solenoid engageable with the link and operable when energized to move the link a predetermined amount, a spring to move the link a like amount in the opposite direction when the solenoid is deenergized, a pawl carried by the link and operable when the link is moved in one of said directions to engage the ratchet wheel and rotate the same a predetermined amount, and a foot operated switch selectively to energize said solenoid.

3. A mechanism to produce cross feeding between a cutting member and a work supporting member of a machine tool in selected predetermined discrete amounts comprising a rotatable shaft operatively connected to one of said members to move the same upon rotation of the shaft, a ratchet wheel having a plurality of teeth and operatively connected to said shaft to rotate the same upon rotation of the ratchet wheel, a movable link adjacent the ratchet wheel and having a pawl operable to ride over a series of said teeth when the link is moved in one direction and to engage the teeth and rotate the ratchet wheel when moved in the opposite direction, a solenoid engageable with said link and operable to move the same in one direction a predetermined amount, means to move the link a like amount in the opposite direction, a fixed bracket adjustable in relation to the ratchet wheel and having a leg extending between the pawl and the teeth of the ratchet wheel to engage the pawl upon movement of the link and guide the pawl into engagement with a selected tooth of said series of teeth on the ratchet wheel, and means selectively to energize said solenoid.

4. A mechanism to produce cross feeding movement between the cutting member and the work supporting member in a cutter grinder in selected predetermined discrete amounts comprising a housing, a shaft rotatably received in the housing and operatively connected to one of said members to move the same upon rotation of the shaft, a pinion loosely received on said shaft, a ratchet wheel having a plurality of teeth carried by said pinion for rotation therewith, a second pinion snugly received on said shaft, a pair of connected gears rotatably carried by the housing and in engagement with said pinions to rotate the shaft upon rotation of the ratchet wheel, a movable link having a longitudinal adjacent the ratchet wheel, the link having a pawl operable to ride over a series of said teeth when the link is moved in one direction and to engage the teeth and rotate the ratchet wheel when moved in the opposite direction, a solenoid engageable with said link and operable to move the same axially in one direction a predetermined amount, means to move the link a like amount in the opposite direction, a fixed bracket adjustable in a direction parallel to the axis of the link and having a leg extending between the pawl and the teeth of the ratchet wheel to engage the pawl upon movement of the link and guide the pawl into engagement with a selected tooth of said series of teeth on the ratchet wheel when the link is moved in said opposite direction, and a foot operated switch selectively to energize said solenoid.

5. A mechanism to produce cross feeding between a cutting member and a work supporting member of a machine tool in predetermined discrete amounts comprising a rotatable shaft operatively connected to one of said members to move the same upon rotation of the shaft, a ratchet wheel having a plurality of teeth and operatively connected to said shaft to rotate the same upon rotation of the ratchet wheel, a movable link adjacent the ratchet wheel, a solenoid engageable with the link and operable when energized to move the link a predetermined amount, means to move the link a like amount in the opposite direction when the solenoid is deenergized, a pawl carried by the link and operable when the link is moved in one of said directions to engage the teeth of the ratchet wheel and rotate the wheel a predetermined amount, means selectively to energize the solenoid, and a bracket rotatable with the ratchet wheel and rotatably adjustable in relation thereto, the bracket having a leg overhanging said teeth to engage the pawl whereby engagement of the pawl with the teeth is precluded after a selected number of discrete rotations of the ratchet wheel.

6. A mechanism to produce cross feeding between a cutting member and a work supporting member of a machine tool in predetermined discrete amounts comprising a rotatable shaft operatively connected to one of said members to move the same upon rotation of the shaft, a handwheel connected to said shaft, a ratchet wheel operatively connected to said shaft to rotate the same upon rotation of the ratchet wheel, a movable link adjacent the ratchet wheel, a solenoid engageable with the link and operable when energized to move the link a predetermined amount, means to move the link a like amount in the opposite direction when the solenoid is deenergized, a pawl carried by the link and operable when the link is moved in one of said directions to engage the teeth of the ratchet wheel and rotate the wheel a predetermined amount, a detent to engage the pawl at the end of the movement of the link in said one direction to disengage the pawl from the teeth of the ratchet wheel, and means selectively to energize the solenoid.

7. A mechanism to produce relative cross feeding between a cutting member and a work supporting member of a cutter grinder in selected predetermined discrete amounts comprising a housing, a shaft rotatably received in the housing and operatively connected to one of said members to move the same upon rotation of the shaft, a handwheel connected to said shaft, a ratchet wheel having a plurality of teeth operatively connected to said shaft to rotate the same upon rotation of the ratchet wheel, a link adjacent the ratchet wheel and having a pawl operable to ride over a series of said teeth when the link is moved in one direction and to engage the teeth and rotate the ratchet wheel when the link is moved in the opposite direction, a solenoid engageable with said link and operable to move the same in one direction a predetermined amount, means to move the link a like amount in the opposite direction, a fixed bracket adjustable in relation to the ratchet wheel and having a leg extending between the pawl and the teeth of the ratchet wheel to engage the pawl upon movement of the link and guide the pawl into engagement with a selected tooth of said series of teeth on the ratchet wheel, a second bracket rotatable with the ratchet wheel and rotatably adjustable in relation thereto, said second bracket having a leg overhanging said teeth to engage the pawl, a detent to engage the pawl at the end of the movement of the link in said one direction to disengage the pawl from the teeth of the ratchet wheel, and a foot operated switch selectively to energize said solenoid.

References Cited in the file of this patent

UNITED STATES PATENTS

| | | |
|---|---|---|
| 2,692,457 | Bindszus | Oct. 26, 1954 |
| 2,735,233 | Henkel | Feb. 21, 1956 |
| 2,759,304 | Silven | Aug. 21, 1956 |